Oct. 18, 1932.  R. B. PEALER  1,883,397
DIESTOCK
Filed Aug. 16, 1930
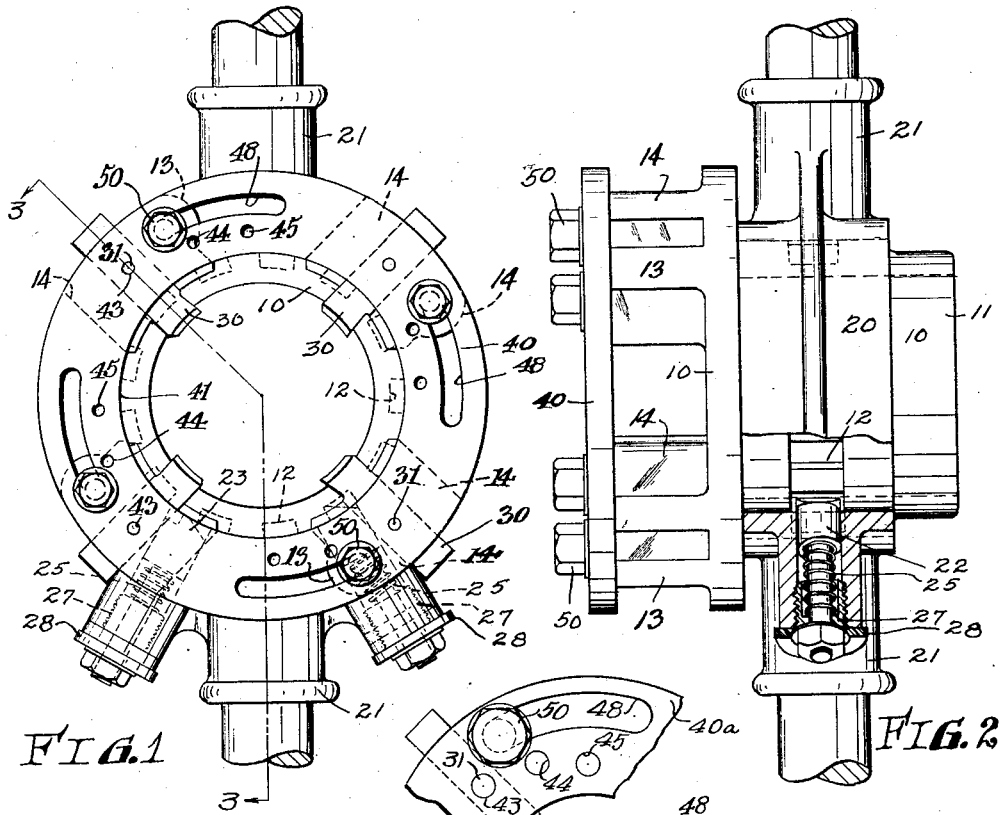
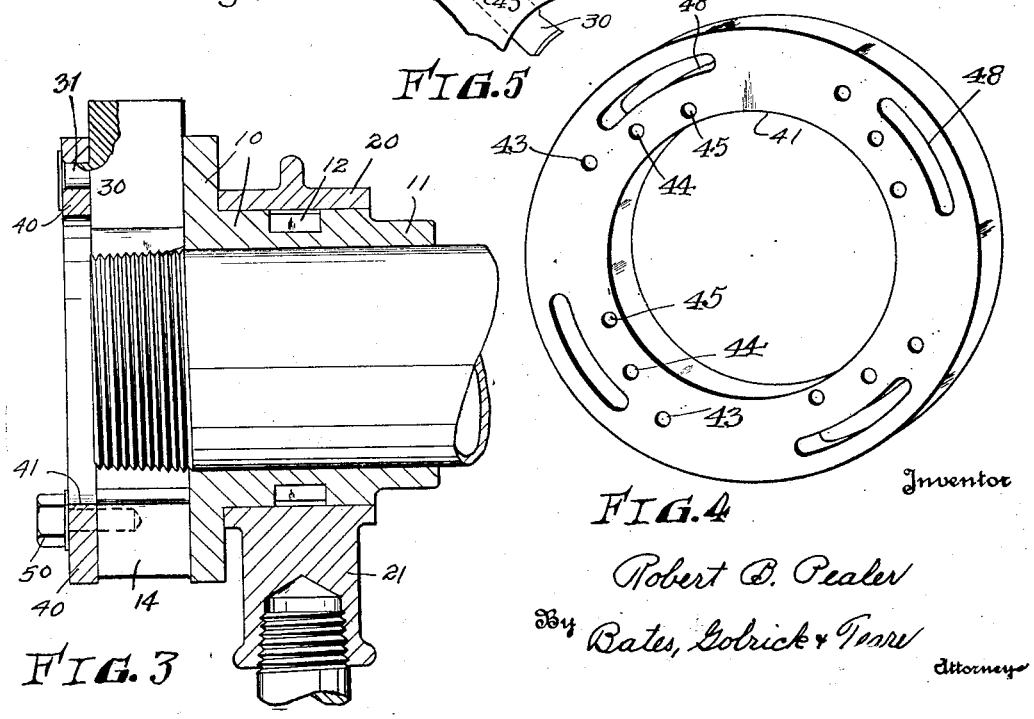
Inventor
Robert B. Pealer
By Bates, Golrick & Teare
Attorneys Patented Oct. 18, 1932

1,883,397

UNITED STATES PATENT OFFICE

ROBERT B. PEALER, OF WARREN, OHIO, ASSIGNOR TO THE BORDEN COMPANY, OF WARREN, OHIO, A CORPORATION OF OHIO

DIESTOCK

Application filed August 16, 1930. Serial No. 475,813.

This invention relates to a die stock of the type wherein the chasers are settable for different sizes of pipe but remain in fixed position during the thread cutting operation. One of the objects of the invention is to provide such a tool in a compact and simple form adapted to be cheaply produced, and, to that end, I provided a very simple form of clamping device adapted to hold the chasers in position.

My die stock is illustrated in the drawing hereof, is hereinafter more fully explained, and its essential novel features are summarized in the claim.

In the drawing Fig. 1 is a face view of my die stock. Fig. 2 is a side elevation thereof. Fig. 3 is an axial section. Fig. 4 is a face view of the clamping plate shown in Fig. 1. Fig. 5 is a fragmentary view of a portion of the die stock illustrating the parts controlling the adjustment.

The frame of my die stock comprises a suitable hollow member 10, which may be a single integral casting carrying thread cutting chasers adjacent one end, and formed into a suitable pipe guide 11 adjacent the other end, and intermediately having external means whereby the frame may be rotated.

I have shown in the drawing as a means for rotating the frame, suitable notches or teeth 12, made in the intermediate body of the frame, and a ring 20 surrounding this intermediate region and having handle sockets 21 and carrying a pair of ratchet pawls 22 and 23 coacting with the frame teeth. Each pawl is shown as mounted in a recess in the driving frame 20 and is pressed inwardly by a spring 25 compressed between a shoulder on the pawl and a bushing 27 carried by the driving frame. The pawl has a shank 28 extending through this bushing, and carrying a head 29 by which the pawl may be withdrawn. Preferably two pawls are employed, offset one from the other by the distance of half a tooth, thereby reducing the angular movement required by the operating handle for the engagement of successive teeth.

On one side of its intermediate region, the frame is provided with a number of equi-distant housings for the chasers, each housing comprising a pair of parallel bosses 14 and 13 leaving a parallel-sided recess between them.

Each recess is adapted to be occupied by a parallel-sided chaser 30. On opposite sides, the chaser is slidably guided by the bosses 12 and 13, while the inner face of the chaser rests upon the frame 10 at the bottom of the housing, which in this region lies in a single plane. Each chaser 30 is formed with an upstanding lug or pin 31 which is adapted to coact with an annular clamping plate which serves the double purpose of holding the chasers down against the frame and of defining their positions.

The clamping plate above mentioned may be of the form shown at 40 in Figs. 1 and 4. It has a central opening 41, of diameter sufficient to clear the pipe, and is provided with groups of holes, as 43, 44 and 45, individually at different distances from the axis and any one of which stands over the respective chaser-receiving recesses, and can be occupied by the corresponding pin 31 of the chaser. The clamping plate is held in place by screws 50, which pass through it in variable regions into threaded openings in frame bosses which are, in effect, enlargements of the frame portion 13, constituting one side of the chaser housing. These screws have heads bearing on the outer face of the clamping plate and thus held rigidly in place to positively define the position of the chasers against movement in the outward or inward direction. The chasers have the same height as the housings, or if desired, may be a trifle higher to insure the plate clamping directly on the chasers themselves.

The adjustment, either for different sizes of pipe or for variations of the standard size, is readily effected by employing the clamping plate 40 illustrated in Figs. 1 and 4. The plate there shown has three holes, 43, 44 and 45, either of which may receive a chaser pin 31 and thus hold the chaser in three different positions. When this construction is employed, there may be three holes available for each of the bolts 50, but it is simpler to employ an arcuate slot as shown at 48, so that the bolt does not have to be entirely removed to enable the plate to be shifted.

It will be seen that my die stock comprises very few parts, and these may be of comparatively light construction, so that I have provided a settable tool which has the advantages of lightness, compactness, and cheapness of manufacture.

I claim:

In a die stock, the combination of a frame having spaced chaser guides with clearance openings between them, a clamping ring overlying said guides and having an arcuate slot through it, means passing through the slot for locking the ring to the frame in various positions, said ring having groups of holes through it all located back from the inner periphery of the ring and individually at varying distances therefrom, and chasers rectangular in cross section standing on one of their narrow edges in guides and having pins projecting from their other narrow edges, each pin being adapted to occupy any of the holes of the group corresponding to that guide.

In testimony whereof, I hereunto affix my signature.

ROBERT B. PEALER.